United States Patent [19]

Ohe et al.

[11] Patent Number: 5,735,470
[45] Date of Patent: Apr. 7, 1998

[54] IRRIGATION HOSE HAVING HOLES FORMED ON EXTERNAL WALLS OF ALL FLOW PASSAGES

[75] Inventors: Tatsuya Ohe, Yamaguchi-ken; Toshihisa Hori, Tokyo, both of Japan

[73] Assignee: Mitsui Petrochemical Industries, Ltd., Tokyo, Japan

[21] Appl. No.: 895,627

[22] Filed: Jul. 17, 1997

Related U.S. Application Data

[63] Continuation of Ser. No. 547,072, Oct. 23, 1995, abandoned.

[30] Foreign Application Priority Data

Oct. 27, 1994 [JP] Japan ..................... 6-263607

[51] Int. Cl.⁶ ..................................... B05B 15/00
[52] U.S. Cl. .................. 239/566; 239/567; 239/450; 239/547
[58] Field of Search .................. 239/542, 547, 239/450, 536, 548, 556, 550, 566, 567

[56] References Cited

U.S. PATENT DOCUMENTS

| | | | |
|---|---|---|---|
| 2,339,632 | 1/1944 | Folsom | 239/560 |
| 2,743,960 | 5/1956 | Kamin . | |
| 2,749,180 | 6/1956 | Andrews | 239/450 |
| 3,080,124 | 3/1963 | Rathman | 236/547 |
| 3,567,134 | 3/1971 | Smith . | |
| 4,161,290 | 7/1979 | Hill | 239/542 |
| 4,193,552 | 3/1980 | Ishikawa . | |
| 4,285,472 | 8/1981 | Okada et al. | 239/542 |

FOREIGN PATENT DOCUMENTS

| | | | |
|---|---|---|---|
| 1088721 | 3/1955 | France | 239/450 |
| 2600142 | 12/1987 | France . | |
| 2642158 | 3/1977 | Germany . | |
| 2613386 | 10/1977 | Germany . | |
| 2643710 | 3/1978 | Germany . | |
| 55-15740 | 2/1980 | Japan . | |
| 57-97984 | 6/1982 | Japan . | |
| 61-140283 | 8/1986 | Japan . | |
| 62-205729 | 9/1987 | Japan . | |
| 64-13921 | 1/1989 | Japan . | |
| 0750939 | 2/1995 | Japan . | |
| 739606 | 11/1955 | United Kingdom | 239/547 |
| 2214600 | 9/1989 | United Kingdom | 239/450 |

*Primary Examiner*—Kevin Weldon
*Attorney, Agent, or Firm*—Birch, Stewart, Kolasch & Birch, LLP

[57] ABSTRACT

An irrigation hose provides a long life expectancy. The irrigation hose is characterized in that a plurality of flow passages are defined by partitions dividing the inside of the hose which is made of thermoplastic resin; and that each flow passage is provided with irrigation holes formed in a member of the tube portion which is in contact with outside air, that is the outer wall thereof. The irrigation hose can provide different irrigation methods appropriate to the crops or growth stages with just one hose, without exchanging or laying multiple hoses with different irrigation methods. A film 16 is inserted between a film 12 which is made of long thermoplastic resin film with irrigation holes formed throughout at regular pitch and another film 12 which is also made of a long thermoplastic resin film with irrigation holes on both sides. One side of the film 16 is heat sealed to the lower film 12 and the other to the upper film 12, and both sides of the upper and lower films 12 along the longitudinal direction are heat sealed to one another so as to construct flow passages 29A and 29B with different formations of irrigation holes.

6 Claims, 5 Drawing Sheets

FIG. 1
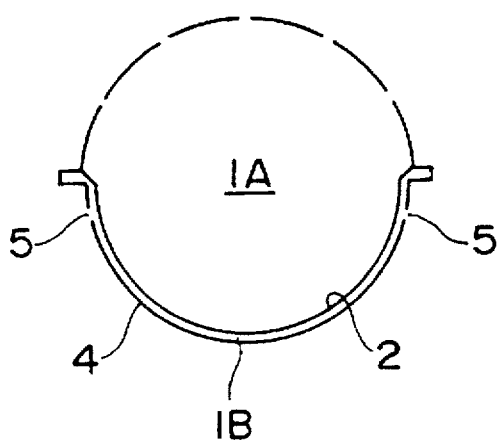
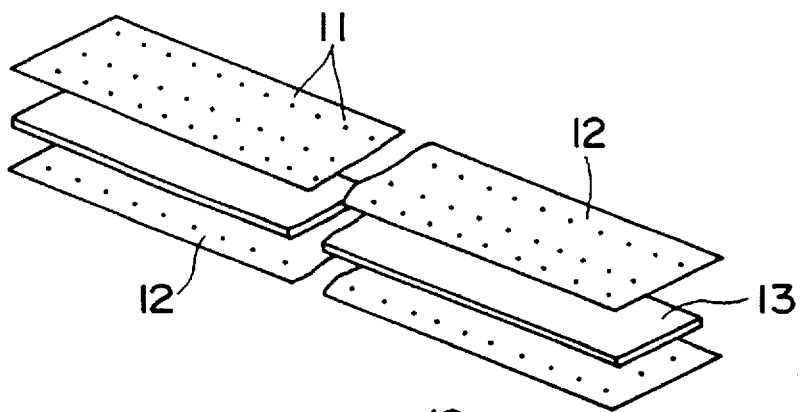
FIG. 2A
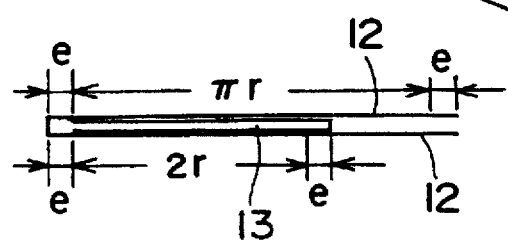
FIG. 2B
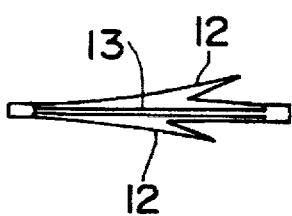
FIG. 2C

IRRIGATION HOSE HAVING HOLES FORMED ON EXTERNAL WALLS OF ALL FLOW PASSAGES

This application is a continuation of application Ser. No. 08/547,072 filed on Oct. 23, 1995, now abandoned.

BACKGROUND OF THE INVENTION

1. Field of Invention

The present invention relates to an irrigation hose, more particularly, to an irrigation hose used for irrigation of field crops in open and green house culture.

2. Description of the Related Art

The irrigation equipment used for irrigation of field crops in open and green house culture conventionally comprises a water supply pipe laid along an end of every furrow, which is connected to a water duct coupled with a water source such as a pump, and perforated polyvinylchloride tubes, one of which ends is connected to the water supply pipe.

Recently, however, instead of perforated polyvinylchloride tubes, irrigation hoses made of synthetic resin film have become commonly used as they are light, inexpensive, easy to manufacture, superior in flexibility, and easy to process, store, and remove.

These irrigation hoses are generally formed by fusing longitudinally two long thermoplastic resin films at the both lateral ends thereof which are provided with many irrigation holes.

SUMMARY OF THE INVENTION

The greatest cause of failure of the irrigation hoses is obstruction of the irrigation holes.

The first object of the present invention is to provide an irrigation hose with a longer life expectancy.

When irrigating field crops, different irrigation methods are sometimes required, such as partial irrigation to base of the products or total irrigation with spraying format, depending on the kinds of crops or their growth stages. Thus, irrigation hoses, conventionally, are exchanged for different irrigation methods depending on the crops or their growth stages, or multiple hoses of appropriate formats laid in every furrow are selected.

The second object of the present invention is to provide an irrigation hose capable of spraying water in different irrigation methods.

The irrigation hose designed to achieve the first object is characterized by that a plurality of flow passages are defined by partitions dividing the inside of the hose which is made of thermoplastic resin; and that each flow passage is provided with irrigation holes formed in a member of the tube portion which is in contact with outside air, that is the outer wall thereof.

When irrigating, only one of the flow passages is used at any one time. Water is conveyed through the irrigation holes of the passage to irrigate agricultural crops. If agricultural crops are cultivated on both sides of a hose, water is irrigated from the top half or from both sides of the hose. When the holes are plugged and the flow passage can be no longer used, another flow passage is used by changing the position of the irrigation hose.

The irrigation hose designed to achieve the second object features a plurality of flow passages created by partitions dividing the inside of the hose which is made of thermoplastic resin; and the outer wall of each flow passage which is provided with irrigation holes formed in a member of the tube portion which is in contact with outside air, wherein the irrigation holes of each flow passage are different at least in shape, size, arrangement, and/or pitch.

Depending on the type of crops and their growth stages, the flow passage of the hose with the most appropriate irrigation method will be used.

The form of the tube to be used for the irrigation hose to achieve the first and second objects stated above may be made of stiff tube or of film.

When two divided flow passages are formed in the irrigation hose to achieve the first and second objects stated above, it is desirable for the flow passage used to have approximately the same sectional area as that of the inner portion of the tube so that the required flow rate of water may be achieved without changing the hydraulic pressure. In order that, the partition should be made of a soft and flexible thermoplastic resin film so that the partition will completely touchs to the inner tube wall of the other flow passage.

The irrigation hose designed to achieve the first object, as well as the irrigation hose designed to achieve the second object may pass water through a plurality of flow passages to simultaneously irrigate different crops. This enables expansion of the irrigation area and irrigation of right and left sides with different methods simultaneously. When two flow passages are formed inside the tube and water is conveyed through both passages at the same time, there will be no problem as long as the same hydraulic pressure is applied to each passage. If the hydraulic pressure in each flow passage differs, the flow passage with the higher hydraulic pressure, designated as 1A in FIG. 1, expands, and the partition, designated as 2, touches the inner tube wall, designated as 4, of the flow passage 1B with the lower hydraulic pressure, thereby blocking irrigation holes 5 of said tube wall 4 and possibly preventing the flow passage 1B from functioning. In order to solve this problem, the partition should be formed in such a way that it will not touch the inner tube wall when water is conveyed through.

The irrigation holes, especially those which are required to spray water, are easily plugged. In order to reduce or prevent from plugging, it is desirable to install a filter along the flow passages, such as a sheet filter made of non-woven fabric, to at least one, and ideally to all, of the flow passages of the above mentioned irrigation hose.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIG. 1 is a cross-sectional view of an irrigation hose when water is conveyed through two flow passages with different irrigation methods;

FIG. 2A is a perspective view showing the manufacturing process of the irrigation hose of one embodiment of the present invention;

FIG. 2B is a sectional view showing the manufacturing process of the irrigation hose of the embodiment;

FIG. 2C is a sectional view showing the manufacturing process of the irrigation house of the embodiment;

DETAILED DESCRIPTION OF THE PREFERRED EMBODIMENTS

Figure 3:
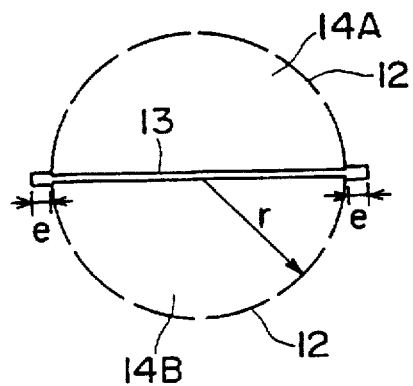
FIG. 3 is a cross-sectional view of the irrigation hose in use, manufactured by the method shown in FIG. 2.

FIGS. 2A and 2B show two long thermoplastic resin films 12 of which widths are πr+2e and having irrigation holes 11, over one of which is a film of the same length and the width of 2r+2e, also made of thermoplastic resin, designated as 13. After placing the other film 12 over the films 13 and 12 with one long side of all three flush, the width on the flush side is heat-sealed. Subsequently, as shown in FIG. 2C, the other side of the films 12 are laid flush with the other side of the film 13, and the other width e of the three films are heat-sealed. Thus, semicircular flow passages with the radius r, designated as 14A and 14B, are formed over and under the film 13 as shown in FIG. 3.

The irrigation hose of one embodiment is structured as described above. When in use, the irrigation water is conveyed through the upper flow passage 14A as shown in FIG. 3. When plugging of the irrigation holes occurs, the irrigation hose is inverted and the flow passage 14B, now facing upward, will be used.

Figure 4:
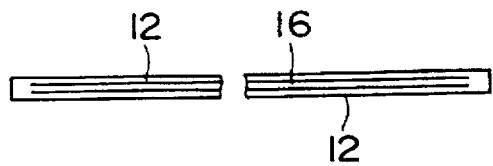
FIG. 4 is an expanded cross-sectional view of the irrigation hose, before use, of another embodiment of the present invention.
Figure 5:
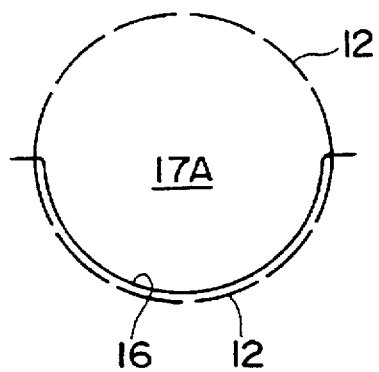
FIG. 5 shows a cross-sectional view of the irrigation hose shown in FIG. 4 in use.

FIG. 4 shows another embodiment of the irrigation hose, wherein a thermoplastic resin film 16 of the same length and width as the film 12 is inserted between the films 12 and both sides of the films are heat sealed. When water is conveyed through the upper flow passage 17A, as shown in FIG. 5, the film 16 will be pushed to the lower film 12, expanding 17A to form an almost circular shape. If the irrigation holes of the flow passage 17A becomes plugged, the hose is also inverted as in the case of FIG. 3.

Figure 6:
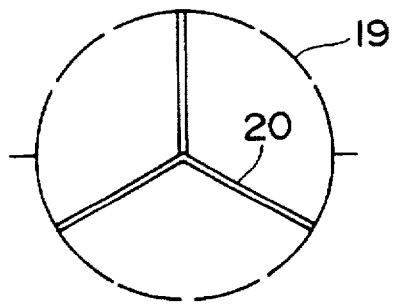
FIG. 6 shows a cross-sectional view of another embodiment of the present invention.
Figure 7:
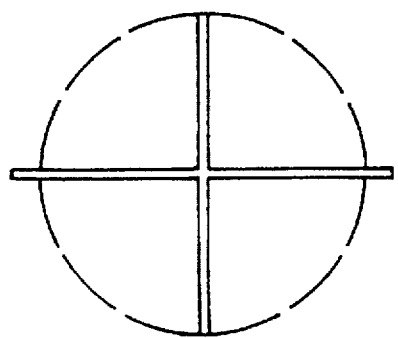
FIG. 7 is a cross-sectional view of yet another embodiment of the present invention.

FIG. 6 shows an example of the inside of an irrigation hose 19, divided into three flow passages by such films 20 as described previously, and FIG. 7 is an example of an irrigation hose, the inside of which is divided into four flow passages.

Figure 8:
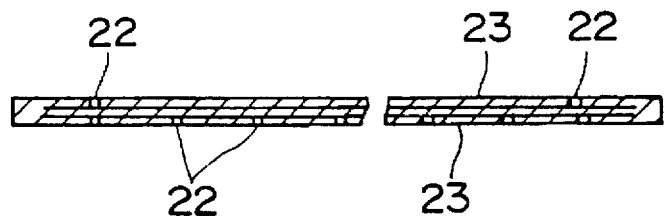
FIG. 8 is an enlarged cross-sectional view of an irrigation hose capable of irrigating with different irrigation methods.
Figure 9:
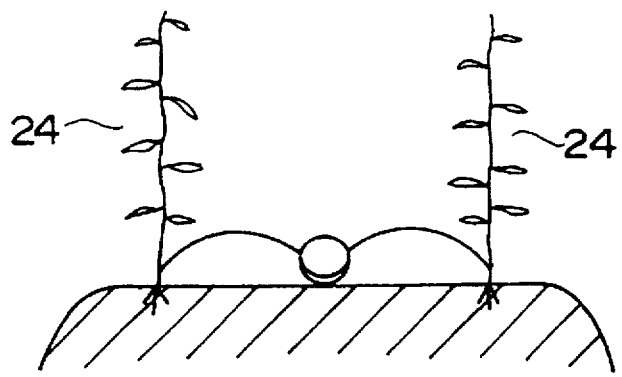
FIG. 9 is a schematic illustration for cultivating tomatoes using the upper flow passage of the irrigation hose shown in FIG. 8.

FIG. 8 shows the irrigation hose as shown in FIG. 4 wherein irrigation holes 22 are formed longitudinally at regular intervals on each side of the upper film 23, and more than three sets of regularly spaced holes are formed longitudinally regular intervals on the lower film 23. When cultivating tomatoes, as shown in FIG. 9, the irrigation hose is laid in a fashion to face the film 23 with holes on both sides facing upward, irrigating just the base of the tomatoes 24 from the holes on the sides.

Figure 10:
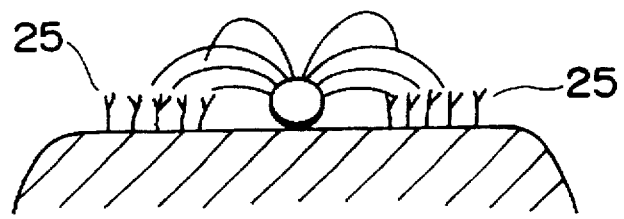
FIG. 10 is a schematic illustration for cultivating weak vegetables using the lower flow passage of the irrigation hose shown in FIG. 8.

When cultivating weak vegetables such as napa cabbage, lettuce, and cabbage as shown in FIG. 10, the irrigation hose is laid in a fashion to make the film 23 with multiple irrigation holes formed in overall surface thereof to face upward, and spray-type irrigation is conducted overall.

Figure 11:
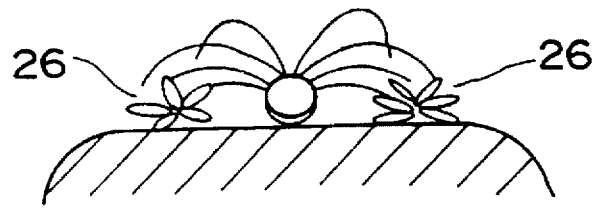
FIG. 11 is a schematic illustration of total irrigation after planting of strawberries.
Figure 12:
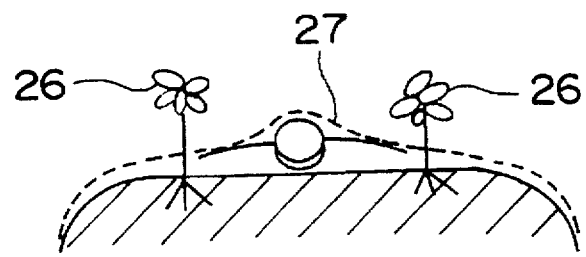
FIG. 12 is a schematic illustration of partial irrigation when a mulch-film is placed over strawberries bed.

The descriptions above indicate an example of how the irrigation methods can be changed according to the crops being cultivated. FIGS. 11 and 12 show an example of changing irrigation methods according to the growth stage of a product. Using strawberries as an example, spray-type irrigation is done when the strawberries 26 are planted (FIG. 11), and when a mulch-film 27 cover the strawberries bed, partial irrigation is done from both sides of the hose so that the irrigation holes will not be blocked by the mulch-film 27 (see FIG. 12).

Figure 13:
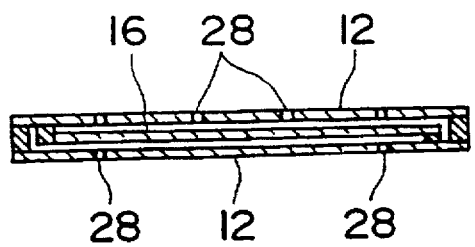
FIG. 13 is a cross-sectional view of an irrigation hose with two flow passages of different irrigation methods.
Figure 14:
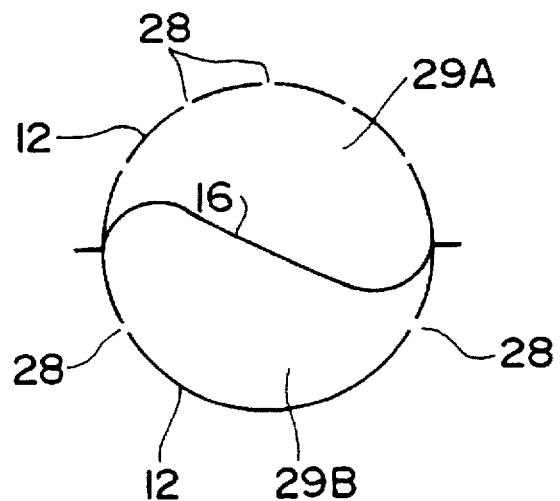
FIG. 14 shows a cross-sectional view of the irrigation hose in use of both flow passages of the hose shown in FIG. 13.

FIG. 13 shows the irrigation hose shown in FIGS. 4 and 5, wherein irrigation holes 28 are formed throughout the upper film 12 and on both sides of the lower film 12, the width of the film 16 is narrowed and one side is heat sealed to the lower film 12, and the other side to the upper film 12, then both sides of these films are heat sealed. When overall spray-type and partial irrigation methods are simultaneously done by conveying water through flow passages 29A and 29B, the narrower film 16 will not come in contact with either upper or lower films 12 as shown in FIG. 14, even though the hydraulic pressure of the two passages are different, thereby making it possible to reliably conduct overall spray-type and partial irrigation without blocking the irrigation holes of each flow passage.

Figure 15:
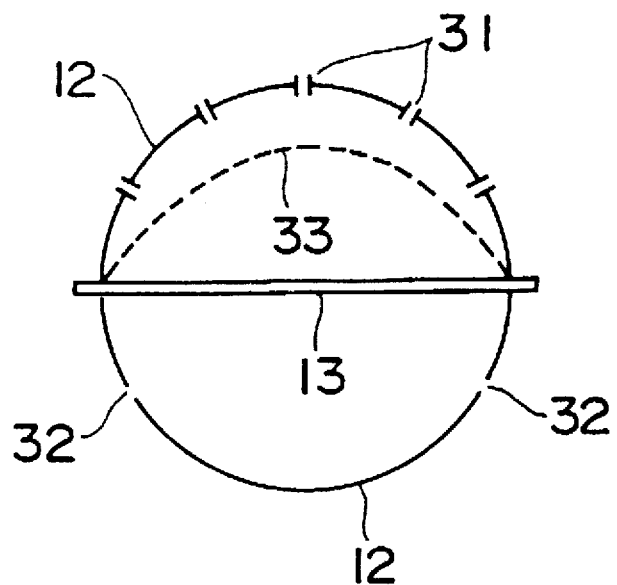
FIG. 15 is a cross-sectional view of an irrigation hose with a non-woven sheet inside the flow passage as a filter.

FIG. 15 shows the irrigation hose as indicated in FIGS. 2A, 2B, 2C and 3 wherein slit holes 31 are formed throughout the upper film 12, and round holes 32 on both sides of the lower film 12, and a filter sheet 33 consisting of a non-woven sheet wider than the film 13 yet narrower than the film 12, is laid over the film 13, and both side of the filter sheet 33 is sandwiched between sides of these films 12, 13, respectively, and both sides at which the filter sheet 33 is sandwiched between these films 12, 13 are heat-sealed to be united.

Figure 16:
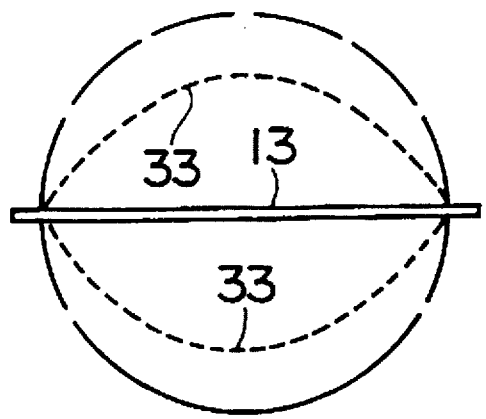
FIG. 16 shows a cross-sectional view of an irrigation hose with non-woven sheets in upper and lower flow passages.

FIG. 16 shows an irrigation hose wherein two non-woven sheets 33 as filter sheets are placed over and under the film 13 and both sides of the sheets are heat sealed.

The present invention, if structured as described above, is effective in the following:

According to the irrigation hose of the present invention, the life expectancy of the irrigation hose can be substantially increased, as another flow passage may be used in the event that the holes of the first flow passage are plugged, and the flow passage is unable to supply water.

According to the irrigation hose of the present invention, one hose is capable of different irrigation methods appropriate to different crops or growth stages without exchanging hoses or laying multiple hoses capable of different irrigation methods.

The irrigation hose of the present invention, even though containing a partition, is capable of securing similar sectional area of flow passage as a hose without a partition, and therefore is capable of achieving the required flow rate of water to the required irrigation area without changing hydraulic pressure.

When water is conveyed through a plurality of flow passages simultaneously, the irrigation hose of the present invention is capable of reliably conducting irrigation with different irrigation methods without the partition blocking the flow passage with uneven hydraulic pressure.

According to the present invention, the irrigation hose having a filtering mechanism in flow passages, plugging in flow passages is substantially reduced or possibly prevented.

It is further understood by those skilled in the art that the foregoing description is a preferred embodiment of the disclosed device and that various changes and modifications may be made in the invention without departing from the spirit and scope thereof.

What is claimed is:

1. An irrigation hose made of thermoplastic resin, said irrigation hose having a multiplicity of flow passages defined by at least one partition dividing the inside thereof, each of said flow passages provided with irrigation holes formed in a member of a tube portion thereof which is in contact with outside air such as that said irrigation holes are formed on external walls of all of said flow passages.

2. An irrigation hose as claimed in claim 1, wherein said irrigation holes each of said flow passages are varied in shape, size, formation, and pitch.

3. An irrigation hose as claimed in claim 1 or 2, wherein said tube member and/or said partitions are made of thermoplastic resin films.

4. An irrigation hose as claimed in any one of claims 1 and 2, wherein said irrigation hose has two of said flow passages defined by a partition, made of thermoplastic resin film, dividing the inside thereof, and said partition completely touches the tube wall of one of said flow passages when water is conveyed through the other flow passage.

5. An irrigation hose as claimed in claim 1 or 2, wherein said irrigation hose has two flow passages defined by partitions, made of thermoplastic resin, dividing the inside thereof, and the partition does not touch the tube wall of a flow passage when water is conveyed through the other flow passage.

6. An irrigation hose as claimed in claim 1 or 2, wherein a filter is installed along said flow passages in at least one of the flow passages.

* * * * *